United States Patent
Kitahara

(10) Patent No.: US 6,698,185 B2
(45) Date of Patent: Mar. 2, 2004

(54) EXHAUST GAS PURIFICATION APPARATUS AND PROCESS FOR INTERNAL COMBUSTION ENGINE

(75) Inventor: Yasuhisa Kitahara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/315,079

(22) Filed: Dec. 10, 2002

(65) Prior Publication Data

US 2003/0126857 A1 Jul. 10, 2003

(30) Foreign Application Priority Data

Jan. 7, 2002 (JP) ........................................ 2002-000805

(51) Int. Cl.⁷ ................................................ F01N 3/00
(52) U.S. Cl. .............................. 60/274; 60/276; 60/278; 60/285; 60/297; 123/109
(58) Field of Search ........................... 60/274, 276, 278, 60/280, 285, 286, 297, 301; 701/103, 109

(56) References Cited

U.S. PATENT DOCUMENTS

| 5,473,887 | A |   | 12/1995 | Takeshima et al. |  |
|---|---|---|---|---|---|
| 5,842,340 | A | * | 12/1998 | Bush et al. | 60/274 |
| 6,237,330 | B1 | * | 5/2001 | Takahashi et al. | 60/285 |
| 6,374,597 | B1 | * | 4/2002 | Bidner et al. | 60/285 |
| 6,487,851 | B1 | * | 12/2002 | Okada et al. | 60/285 |
| 6,499,291 | B2 | * | 12/2002 | Lang et al. | 60/277 |

FOREIGN PATENT DOCUMENTS

JP 2600492 B2 1/1997

* cited by examiner

*Primary Examiner*—Binh Tran
(74) *Attorney, Agent, or Firm*—Foley & Lardner

(57) ABSTRACT

An exhaust gas purification apparatus for an internal combustion engine comprises a NOx trap catalyst disposed in an exhaust passage of the internal combustion engine and a control unit. At a purification timing, the control unit determines a space velocity of exhaust gas and selectively switches between a first air-fuel ratio control mode for controlling the air-fuel ratio of the exhaust gas to a rich air-fuel ratio with no need to decrease a concentration of oxygen in the exhaust gas when the determined space velocity is lower than or equal to a threshold value, and selects a second air-fuel ratio control mode for not only controlling the air-fuel ratio of the exhaust gas to a rich air-fuel ratio but also making the concentration of oxygen in the exhaust gas lower than that of the first air-fuel ratio control mode when the determined space velocity is higher than the threshold value.

23 Claims, 9 Drawing Sheets

EXHAUST GAS PURIFICATION APPARATUS AND PROCESS FOR INTERNAL COMBUSTION ENGINE

BACKGROUND OF THE INVENTION

The present invention relates to an exhaust gas purification apparatus and process for an internal combustion engine.

Japanese Patent No. 2600492 discloses one type of exhaust gas purification apparatus for an internal combustion engine, which is equipped with a NOx trap catalyst in an exhaust passage of the engine. The NOx trap catalyst traps thereon NOx in exhaust gas when an air-fuel ratio of the exhaust gas flowing into the NOx trap catalyst is lean, and reductively purifies the trapped NOx when the exhaust gas air-fuel ratio is richer than a stoichiometric air-fuel ratio. Thus, the above exhaust gas purification apparatus performs, at a purification timing, a so-called "rich spike operation" for temporarily controlling the exhaust gas air-fuel ratio to a rich air-fuel ratio and thereby purifying NOx trapped on the NOx trap catalyst.

SUMMARY OF THE INVENTION

In the above exhaust gas purification apparatus, the rich spike operation is performed by introducing a reducing agent (HC, CO) to the NOx trap catalyst and causing a reaction between NOx and the reducing agent on the NOx trap catalyst in a reductive atmosphere.

However, there is a case that oxygen remains in the exhaust gas even when the air-fuel ratio of the exhaust gas is made rich. In such a case, the reaction between NOx and the reducing agent (HC, CO) does not occur unless the oxygen is consumed through the oxidation of HC and CO so as to create an adequate reductive atmosphere around the NOx trap catalyst. The reaction between NOx and the reducing agent is more unlikely to occur even at the same exhaust gas air-fuel ratio, as the exhaust gas contains a higher concentration of oxygen. Namely, NOx reduction rate per unit time decreases with increase in the concentration of oxygen in the exhaust gas flowing into the catalyst per unit time. For this reason, the above exhaust gas purification apparatus cannot maintain sufficient NOx purification performance and thereby causes a deterioration in automotive emissions when the concentration of oxygen in the exhaust gas is relatively high.

It is therefore an object of the present invention to provide an apparatus and process for purifying exhaust gas from an internal combustion engine with the use of a NOx trap catalyst, which can achieve and maintain sufficient NOx purification performance without being influenced by oxygen in the exhaust gas.

According to a first aspect of the present invention, there is provided an exhaust gas purification apparatus for an internal combustion engine, comprising: a NOx trap catalyst disposed in an exhaust passage of the internal combustion engine, the NOx trap catalyst being capable of trapping thereon NOx in exhaust gas when an air-fuel ratio of the exhaust gas is lean and reductively purifying the trapped NOx when the air-fuel ratio of the exhaust gas is rich; and a control unit configured to: decide on a purification timing at which NOx trapped on the NOx trap catalyst is purified; determine a space velocity of the exhaust gas; at the purification timing, select either one of a first air-fuel ratio control mode for controlling the air-fuel ratio of the exhaust gas to a rich air-fuel ratio with no need to decrease a concentration of oxygen in the exhaust gas and a second air-fuel ratio control mode for not only controlling the air-fuel ratio of the exhaust gas to a rich air-fuel ratio but also making the concentration of oxygen in the exhaust gas lower than that of the first air-fuel ratio control mode, according to the determined space velocity; and control the air-fuel ratio of the exhaust gas in the selected air-fuel ratio control mode, thereby purifying NOx trapped on the NOx trap catalyst.

According to a second aspect of the present invention, there is provided an exhaust gas purification apparatus for an internal combustion engine, comprising: a NOx trap catalyst disposed in an exhaust passage of the internal combustion engine, the NOx trap catalyst being capable of trapping thereon NOx in exhaust gas when an air-fuel ratio of the exhaust gas is lean and reductively purifying the trapped NOx when the air-fuel ratio of the exhaust gas is rich; and a control unit having: means for deciding on a purification timing at which NOx trapped on the NOx trap catalyst is purified; means for determining a space velocity of the exhaust gas; means for selecting, at the purification timing, either one of a first air-fuel ratio control mode for controlling the air-fuel ratio of the exhaust gas to a rich air-fuel ratio with no need to decrease a concentration of oxygen in the exhaust gas and a second air-fuel ratio control mode for not only controlling the air-fuel ratio of the exhaust gas to a rich air-fuel ratio but also making the concentration of oxygen in the exhaust gas lower than that of the first air-fuel ratio control mode, according to the determined space velocity; and means for controlling the air-fuel ratio of the exhaust gas in the selected air-fuel ratio control mode, thereby purifying NOx trapped on the NOx trap catalyst.

According to a third aspect of the present invention, there is provided an exhaust gas purification process for an internal combustion engine with the use of a NOx trap catalyst, the NOx trap catalyst being disposed in an exhaust passage of the engine and capable of trapping thereon NOx in exhaust gas when an air-fuel ratio of the exhaust gas is lean and reductively purifying the trapped NOx when the air-fuel ratio of the exhaust gas is rich, the process comprising: deciding on a purification timing at which NOx trapped on the NOx trap catalyst is purified; determining a space velocity of the exhaust gas; at the purification timing, selecting either one of a first air-fuel ratio control mode for controlling the air-fuel ratio of the exhaust gas to a rich air-fuel ratio with no need to decrease a concentration of oxygen in the exhaust gas and a second air-fuel ratio control mode for not only controlling the air-fuel ratio of the exhaust gas to a rich air-fuel ratio but also making the concentration of oxygen in the exhaust gas lower than that of the first air-fuel ratio control mode, according to the determined space velocity; and controlling the air-fuel ratio of the exhaust gas in the selected air-fuel ratio control mode, thereby purifying NOx trapped on the NOx trap catalyst.

According to a fourth aspect of the present invention, there is provided an exhaust gas purification apparatus for an internal combustion engine, comprising: a NOx trap catalyst disposed in an exhaust passage of the internal combustion engine, the NOx trap catalyst being capable of trapping thereon NOx in exhaust gas when an air-fuel ratio of the exhaust gas is lean and reductively purifying the trapped NOx when the air-fuel ratio of the exhaust gas is rich; and a control unit configured to: decide on a purification timing for reductively purifying NOx trapped on the NOx trap catalyst; and at the purification timing, selectively switch between a first air-fuel ratio control mode for controlling the air-fuel ratio of the exhaust gas to a rich air-fuel ratio and a second air-fuel ratio control mode for not only controlling the air-fuel ratio of the exhaust gas to a rich air-fuel ratio but also making the concentration of oxygen in the exhaust gas lower than that of the first air-fuel ratio control mode, wherein the first air-fuel ratio control mode is selected upon judging a concentration of oxygen in the exhaust gas flowing into the NOx trap catalyst per unit time as being high, and the second air-fuel ratio control mode is selected upon judging the concentration of oxygen in the exhaust gas flowing into the NOx trap catalyst as being low.

DESCRIPTION OF THE EMBODIMENT

The present invention will be more clearly understood from the following description, by way of example only, with reference to the drawings.

Figure 1:
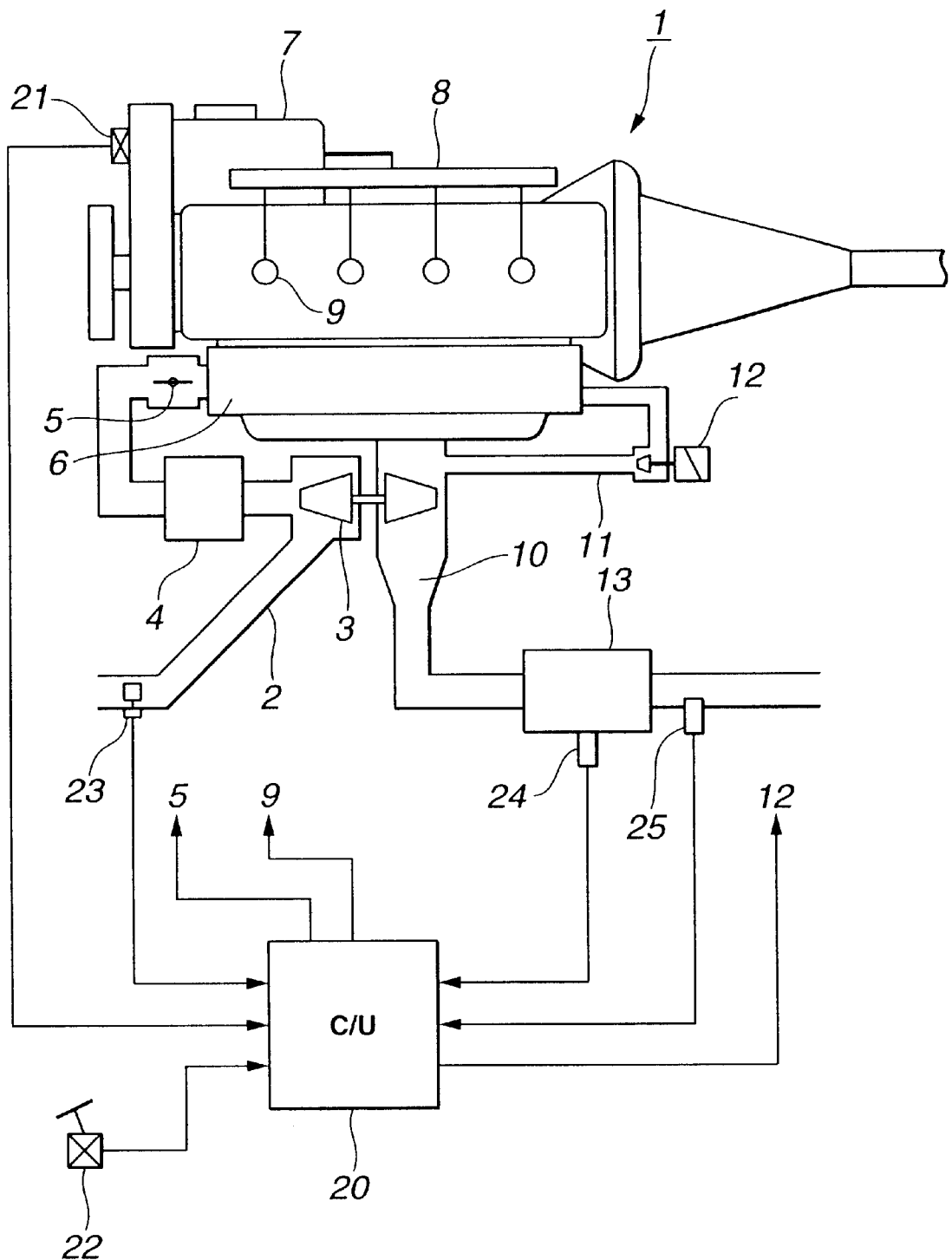
FIG. 1 illustrates an engine system in which the present invention is to be embodied.

FIG. 1 shows an engine system according to one embodiment of the present invention, in which internal combustion engine 1 is designed as a diesel engine. In internal combustion engine 1, intake passage 2 is equipped with an intake compressor of variable displacement turbocharger 3 (often called a "variable nozzle turbocharger"), so that intake air is supercharged by the intake compressor. The intake air is cooled by inter cooler 4 and then fed into a combustion chamber of each engine cylinder through intake throttle valve 5 and collector 6. At the same time, fuel is injected into each combustion chamber by a fuel injector. The fuel injector is structured as a common rail system in which the fuel is pressurized by high pressure fuel pump 7, sent to common rail 8 and then directly injected into the combustion chamber via fuel injection valve 9. The fuel and the intake air are burned in the combustion chamber by compression ignition, and the thus-generated combustion gas is exhausted into exhaust passage 10. For exhaust gas recirculation (EGR), a part of the exhaust gas flowing into exhaust passage 10 is returned as EGR gas to collector 6 through EGR passage 11 and EGR valve 12. The rest of the exhaust gas flows through an exhaust turbine of turbocharger 3, thereby driving turbocharger 3. NOx trap catalyst 13 is disposed in exhaust passage 10 at a downstream side of the exhaust turbine. NOx trap catalyst 13 traps thereon NOx in the exhaust gas when an air-fuel ratio of the exhaust gas flowing into NOx trap catalyst 13 is lean, and catalyzes the reductive purification of NOx when the exhaust gas air-fuel ratio is richer than a stoichiometric air-fuel ratio. Further, NOx trap catalyst 13 contains noble metal supported thereon so as to have the function of oxidizing HC and CO in the exhaust gas.

For the control of internal combustion engine 1, control unit 20 is connected with engine speed sensor 21 for detecting an engine speed Ne, accelerator opening sensor 22 for detecting an accelerator opening APO (i.e. a depression of an accelerator pedal), air flow meter 23 for detecting an intake air amount Qa, catalyst temperature sensor 24 for detecting a temperature Tc of NOx trap catalyst 13 and air-fuel ratio sensor 25 for detecting an air-fuel ratio of the exhaust gas at a downstream side of NOx trap catalyst 13. Catalyst temperature sensor 24 may determine the catalyst temperature Tc based on a temperature of the exhaust gas flowing at around NOx trap catalyst 13, particularly at a position downstream from NOx trap catalyst 13. Upon receipt of signals from these sensors 21 to 25, control unit 20 outputs a fuel injection signal to fuel injection valve 9 so as to adjust a fuel injection amount and an injection timing for each of main and post fuel injections, an opening signal to intake throttle valve 5 and an opening signal to EGR valve 12. Herein, the post fuel injection is performed under predetermined operation conditions after the main fuel injection (at expansion or exhaust stroke) so as to inject a small amount of fuel and thereby enrich the exhaust gas.

Figure 2:
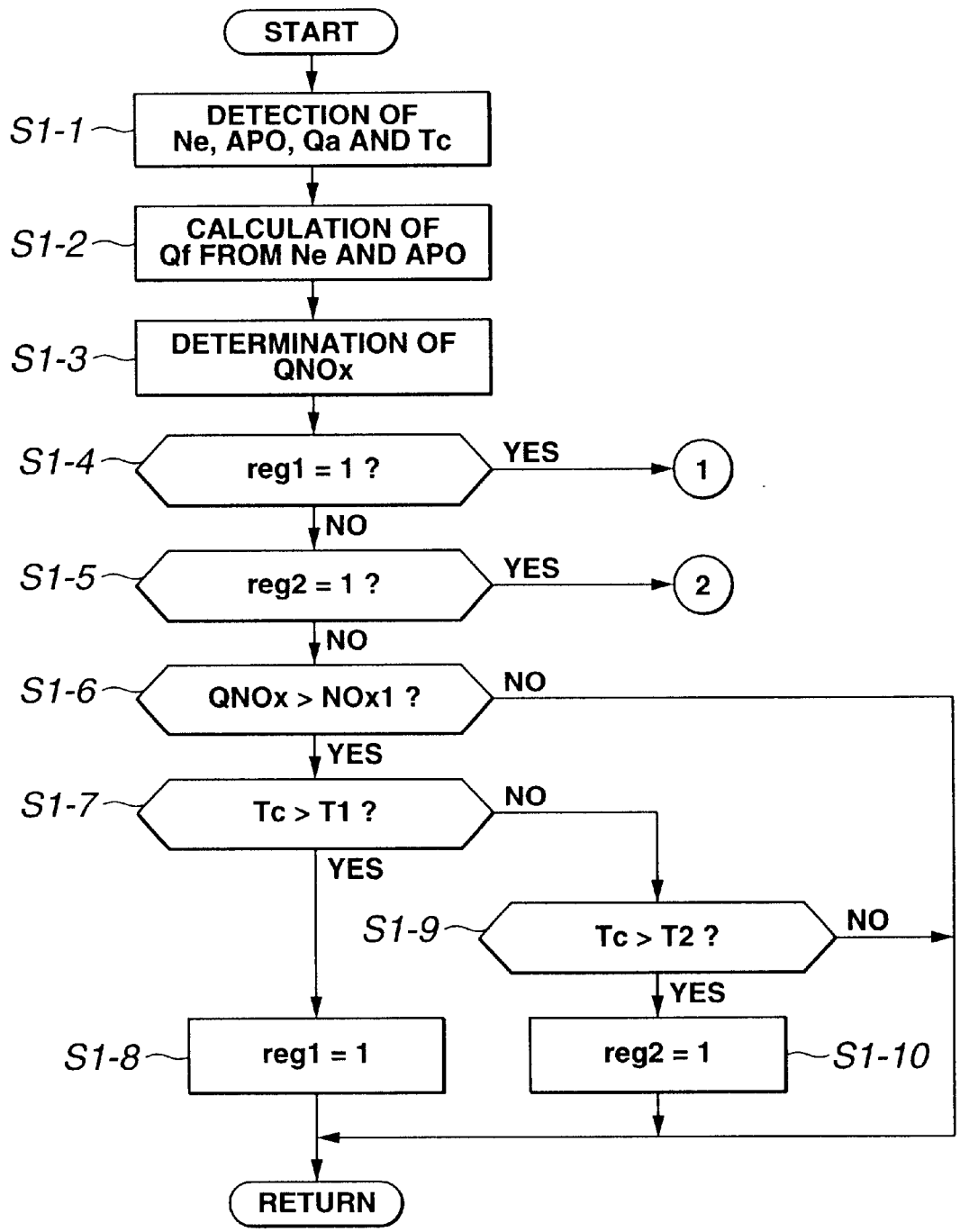
FIGS. 2 to 4 are flowcharts showing an exhaust gas purification process according to one embodiment of the present invention.
Figure 3:
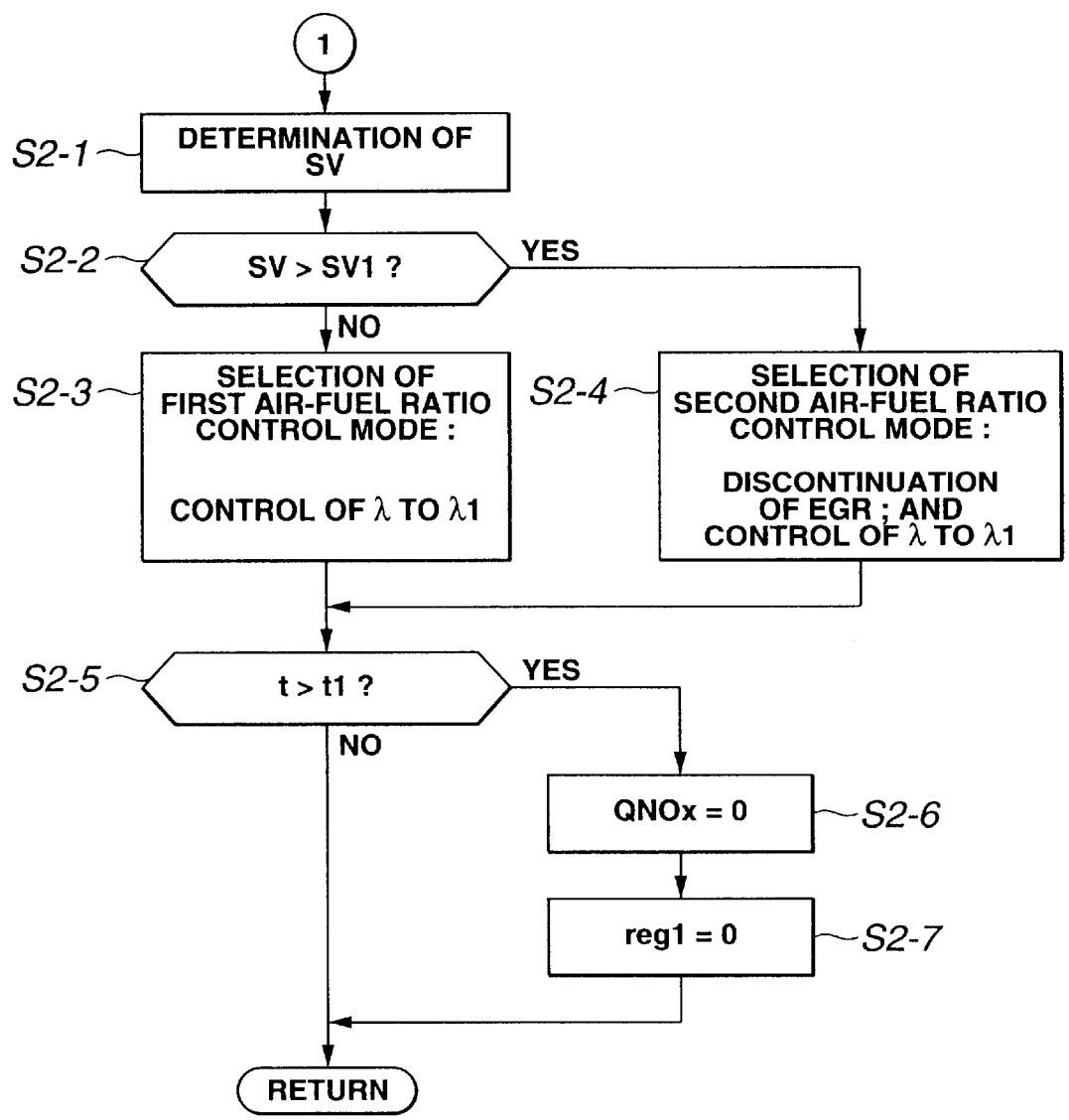
Figure 4:
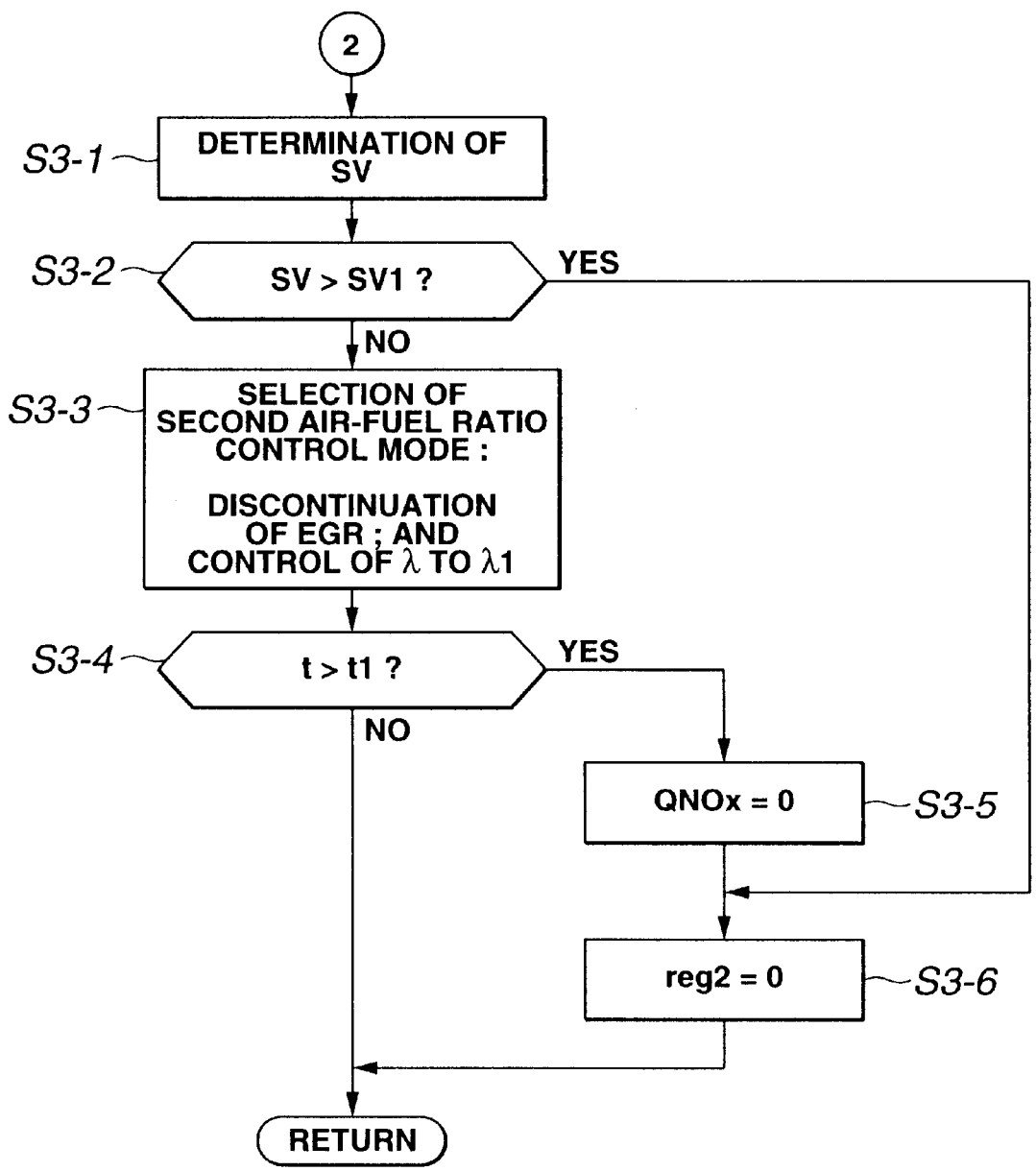

In the present embodiment, control unit 20 is configured to control the exhaust gas purification for reductively purifying NOx trapped on NOx trap catalyst 13. FIGS. 2 to 4 are flowcharts showing an exhaust gas purification process, which is executed by control unit 20, according to one embodiment of the present invention.

Referring to FIG. 2, in step S1-1, control unit 20 detects the engine speed Ne, the accelerator opening APO, the intake air amount Qa and the catalyst temperature Tc based on the signals from engine speed sensor 21, accelerator stroke sensor 22, air flow meter 23 and catalyst temperature sensor 24, respectively.

In step S1-2, control unit 20 determines a fuel injection amount Qf for the main fuel injection by e.g. referring to a map of the operation parameters Ne and APO.

In step S1-3, control unit 20 determines an amount QNOx of NOx trapped on NOx trap catalyst 13. Herein, it is difficult to detect the trapped NOx amount QNOx directly. Thus, control unit 20 determines the trapped NOx amount QNOx indirectly by e.g. estimating an amount of NOx generated per unit time based on the engine speed Ne and the fuel injection amount Qf, calculating an amount of NOx trapped on NOx trap catalyst 13 per unit time from such an estimation in consideration of NOx trap rate, and then, obtaining the integral of the amount of NOx trapped on catalyst 13 per unit time. Alternatively, control unit 20 may determine the trapped NOx amount QNOx based on the integral of the engine speed Ne.

In step S1-4, control unit 20 judges whether a reg1 flag is set (i.e. reg1=1) indicating that the rich spike operation is being effected in a state that NOx trap catalyst 13 has a sufficient activity. If reg1=1, control unit 20 proceeds with the rich spike operation in steps S2-1 to S2-7 (refer to FIG. 3). If reg1≠1, control goes to step S1-5.

In step S1-5, control unit 20 judges whether a reg2 flag is set (i.e. reg2=1) indicating that the rich spike operation is being effected in a state that the activity of NOx trap catalyst 13 is low. If reg2=1, control unit 20 proceeds with the rich spike operation in steps S3-1 to S3-6 (refer to FIG. 4). If reg2≠1, control goes to step S1-6.

In step S1-6, control unit 20 judges whether the trapped NOx amount QNOx determined in step S1-3 is larger than a predetermined value NOx1 in order to decide on a purification timing (i.e. a catalyst regeneration timing). The value NOx1 is generally set to within a range of 0.1 to 0.3 g/l, which is defined as an amount of NOx trapped on a unit catalyst volume, although it varies depending on the kind of NOx trap catalyst 13 used. If QNOx≦NOx1, control unit 20 determines that the purification timing has not come in. Then, control goes to return. If QNOx>NOx1, control unit 20 determines that the has come in purification timing, and control goes to step S1-7.

In subsequent steps S1-7 and S1-9, control unit 20 judges the activity of NOx trap catalyst 13 based on the catalyst temperature Tc.

Figure 5:
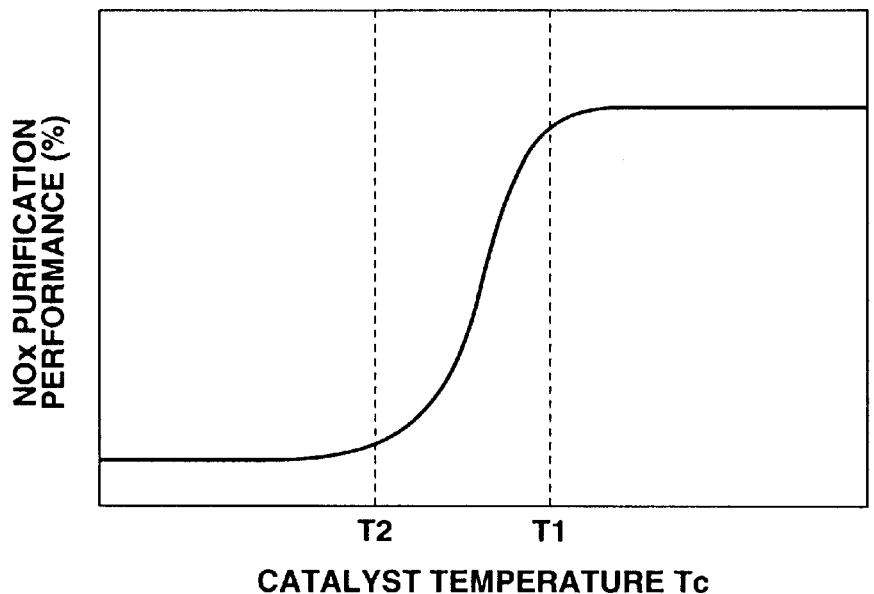
FIG. 5 is a graph showing the temperature-activity relationship for a NOx trap catalyst.

As shown in FIG. 5, NOx trap catalyst 13 starts developing NOx purification performance at a light-off temperature T2 although the performance is not sufficient. NOx purification performance becomes stabilized to a sufficient degree at temperatures higher than a temperature T1. It is thus concluded as follows: NOx trap catalyst 13 attains a sufficient activity when the catalyst temperature Tc is higher than T1; the activity of NOx trap catalyst 13 is low when the catalyst temperature Tc is between T1 and T2; and NOx trap catalyst 13 has no activity when the catalyst temperature Tc is lower than T2. Although the temperatures T1 and T2 vary depending on the kind of NOx trap catalyst 13 used, the temperature T1 is generally about 200° C. and the temperature T2 is generally within a range from 250 to 300° C.

Accordingly, control unit 20 determines in step S1-7 whether the catalyst temperature Tc is higher than T1. If Tc>T1, control unit 20 determines that NOx trap catalyst 13 attains a sufficient activity and thus sets the reg1 flag (reg1=1) in step S1-8. If Tc≦T1, control goes to step S1-9. In step S1-9, control unit 20 judges whether the catalyst temperature Tc is larger than T2 (i.e. the catalyst temperature Tc is in a range from T1 to T2). If Tc>T2, control unit 20 determines that the activity of NOx trap catalyst 13 is low and then sets the reg2 flag (reg2=1) in step S1-10. If Tc≦T2, NOx purification performance cannot be expected for lack of catalytic activity. Thus, control goes to return so as to await the exhaust gas purification until NOx trap catalyst 13 becomes activated.

When reg1=1 in step S1-4, control unit 20 proceeds with the rich spike operation as follows in a state that NOx trap catalyst 13 has a sufficient activity.

Referring to FIG. 3, control unit 20 calculates a space velocity SV in step S2-1. The space velocity SV can be calculated from the existing operation parameter or parameters. For example, the space velocity SV can be determined by dividing the intake air amount Qa by a catalyst volume. As the catalyst volume is fixed for each type of engine, the intake air amount Qa itself can be used as an index of the space velocity SV. Alternatively, the space velocity SV may be determined based on the engine speed Ne or the main fuel injection amount Qf instead of the intake air amount Qa.

Figure 6:
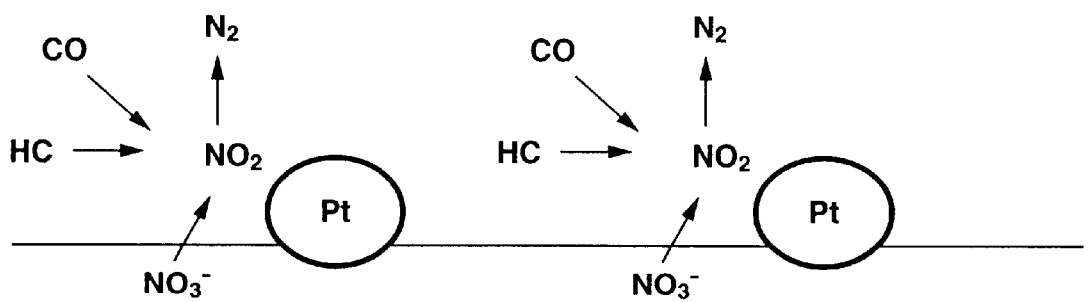
FIG. 6 is a reaction diagram of exhaust gas purification in which exhaust gas ($\lambda<1$) contains no oxygen.
Figure 7:
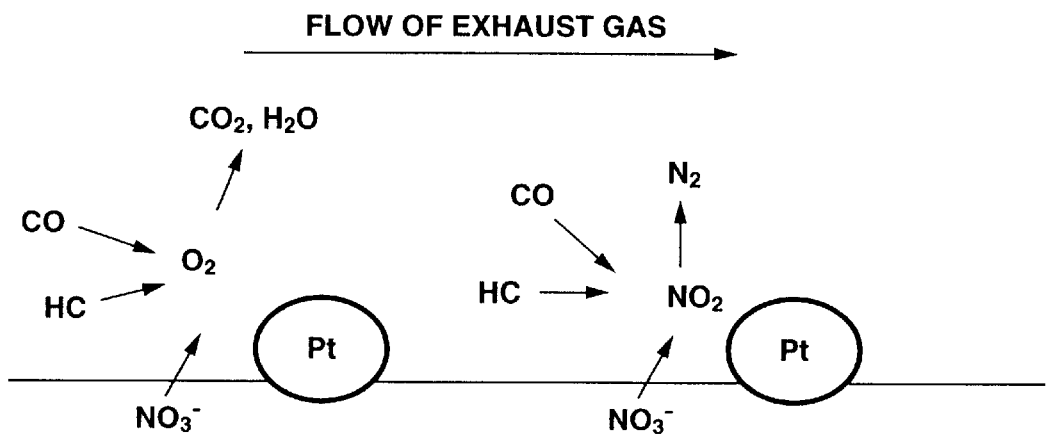
FIG. 7 is a reaction diagram of exhaust gas purification in which exhaust gas ($\lambda<1$) contains oxygen in the case of low space velocity.
Figure 8:
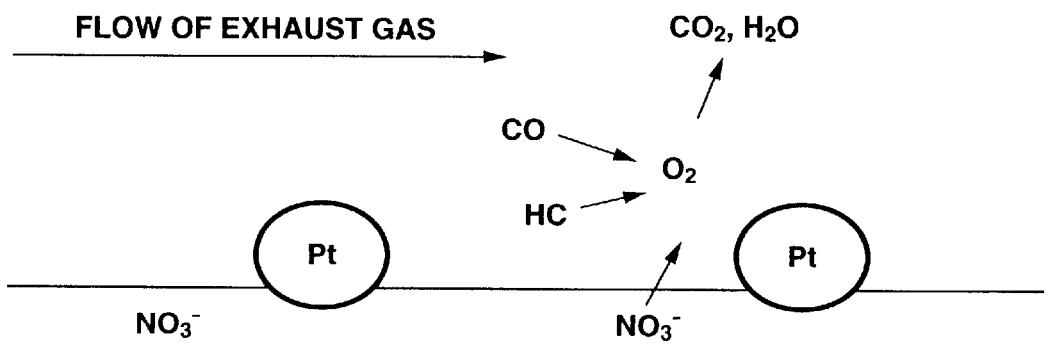
FIG. 8 is a reaction diagram of exhaust gas purification in which exhaust gas ($\lambda<1$) contains oxygen in the case of high space velocity.

Herein, NOx and the reducing agent (HC, CO) in the exhaust gas react with each other on NOx trap catalyst 13 so that NOx is reduced to $N_2$ as shown in FIG. 6, when the exhaust gas of excess air factor λ<1 (rich air-fuel ratio) contains no oxygen. On the other hand, when the exhaust gas of excessive air factor λ<1 (rich air-fuel ratio) contains oxygen, the oxygen is first consumed through the oxidation of HC and CO to create a reductive atmosphere around NOx trap catalyst 13, and then, NOx is purified in such a reductive atmosphere as shown in FIGS. 7 and 8. At this time, the low space velocity SV provides long reaction time (i.e. time for the exhaust gas to pass through NOx trap catalyst 13). It is thus possible to create an adequate reductive atmosphere around NOx trap catalyst 13 by consuming the oxygen in the exhaust gas and then assuredly reduce NOx in the created reductive atmosphere under the three-way action of NOx trap catalyst 13 during such long reaction time, as shown in FIG. 7. However, the reaction time becomes shortened as the space velocity SV is higher. Most of the shortened reaction time is spent in consuming the oxygen in the exhaust gas. There is short time or no time left for NOx trap catalyst 13 to be placed in a reductive atmosphere, as shown in FIG. 8, thereby causing a deterioration in NOx purification performance. It becomes therefore necessary to decrease the concentration of oxygen in the exhaust gas during the rich spike operation in order to attain sufficient NOx purification performance.

Figure 9A:
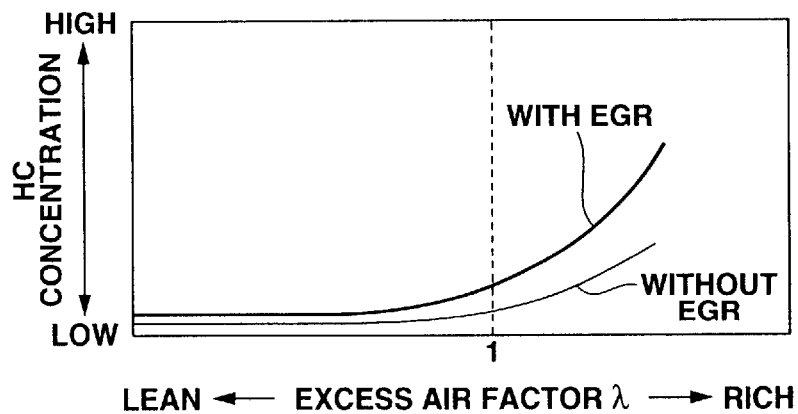
FIGS. 9A, 9B and 9C are graphs showing the variances of HC, CO and $O_2$ concentrations in exhaust gas, respectively, relative to excess air factor $\lambda$.
Figure 9B:
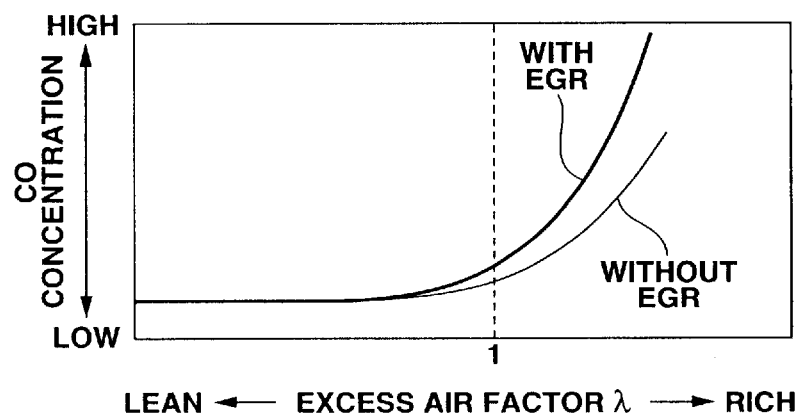
Figure 9C:
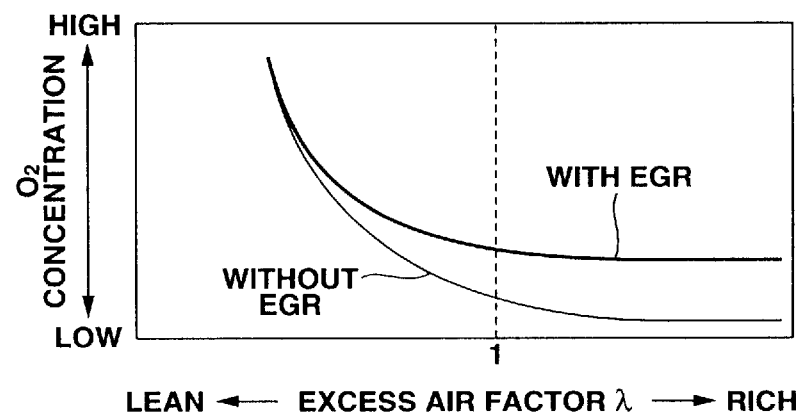

Incidentally, combustion becomes unstable under the influence of EGR as shown in FIG. 9, when internal combustion engine 1 is operated at a rich air-fuel ratio. The distribution of EGR gas in the cylinder (i.e. the concentration of oxygen in the cylinder) is not uniform. The fuel in and around areas of high EGR gas concentration (i.e. of low oxygen concentration) is liable to incomplete combustion to be exhausted as HC components. Correspondingly, some of the oxygen to be burned is exhausted without being consumed by combustion, and the concentration of oxygen in the exhaust gas is higher with EGR than it is without EGR even at the same excess air factor λ. (The concentrations of CO and HC increase with the concentration of oxygen.) It means that the oxygen concentration in the exhaust gas can be decreased by the discontinuation of EGR.

Then, control unit 20 judges instep S2-2 whether the space velocity SV determined in step S2-1 is larger than a threshold value SV1. The value SV1 is generally within a range from 4 to 50,000/h. If SV≦SV1, control unit 20 judges the concentration of oxygen in the exhaust gas as being low, and control goes to step S2-3. If SV>SV1, control unit 20 judges the concentration of oxygen in the exhaust gas as being high, and control goes to step S2-4.

Figure 10:
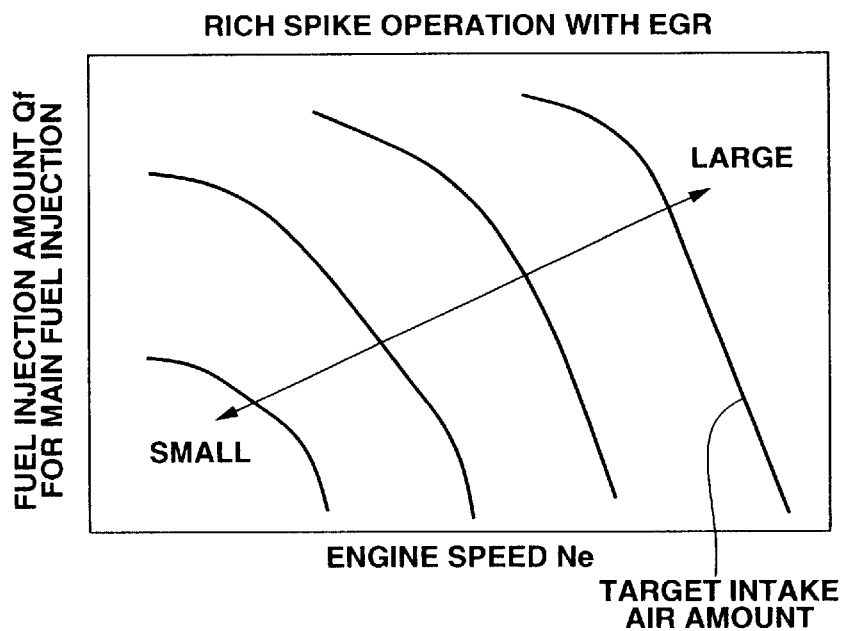
FIG. 10 is a graph showing a target intake air amount for rich spike operation with EGR.

In step S2-3, control unit 20 selects a first air-fuel ratio control mode for controlling the exhaust gas air-fuel ratio to a rich air-fuel ratio without the need to decrease the oxygen concentration in the exhaust gas, and starts the rich spike operation in the first air-fuel ratio control mode. More specifically, control unit 20 sets a target excess air factor λ1 and controls the excess air factor λ of the exhaust gas to the target excess air factor λ1 by adjusting intake throttle valve 5 in such a manner as to attain a target intake air amount. The target excess air factor λ is generally within a range of 0.8 to 0.9, while the target intake air amount can be determined by a relationship between the engine speed Ne and the fuel injection amount Qf for main fuel injection as in FIG. 10. EGR is continued if already effected. For error correction, feedback control is performed based on the signal from air-fuel ratio sensor 25.

Figure 11:
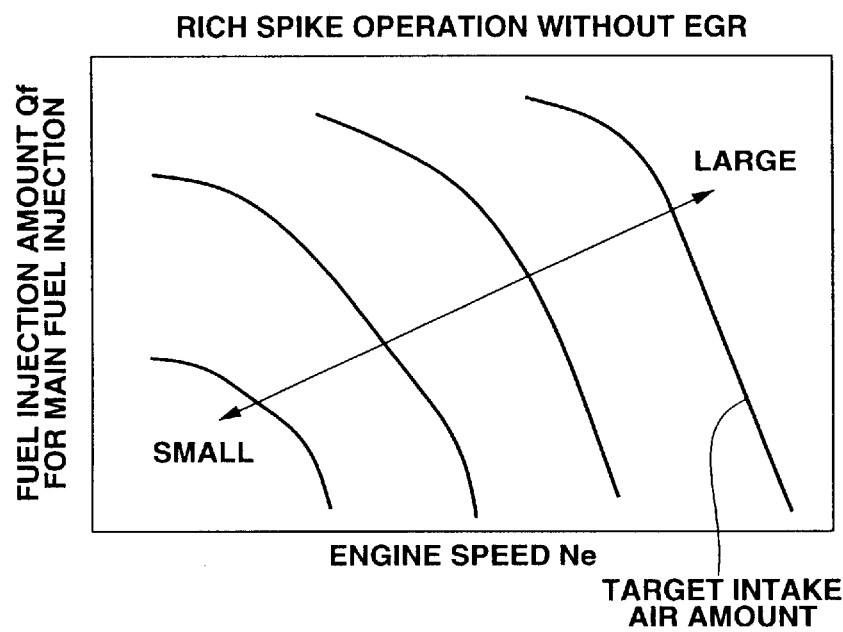
FIG. 11 is a graph showing a target intake air amount for rich spike operation without EGR.

In step S2-4, control unit 20 selects a second air-fuel ratio control mode for not only controlling the exhaust gas air-fuel ratio to a rich air-fuel ratio but also making the concentration of oxygen in the exhaust gas lower than that of the first air-fuel ratio control mode, and then, starts the rich spike operation in the second air-fuel ratio control mode. More specifically, control unit 20 discontinues EGR by adjusting EGR valve 12 and, at the same time, sets the target excess air factor λ1 and controls the excess air factor λ of the exhaust gas to the target excess air factor λ1 by adjusting intake throttle valve 5 in such a manner as to attain a target intake air amount. The target intake air amount can be determined by a relationship between the engine speed Ne and the fuel injection amount Qf for main fuel injection as in FIG. 11. For error correction, feedback control is performed based on the signal from air-fuel ratio sensor 25.

Herein, the method of rich spike operation is not limited to the above, and the rich spike operation can be carried out in various methods by adjusting at least one of the rate of EGR, the air intake amount and the post fuel injection amount.

For example, it is possible in the rich spike operation to lower the excess air factor λ to the target excess air factor λ1 by increasing the opening of EGR valve 12 to attain a high EGR rate as well as decreasing the opening of intake throttle valve 5 to reduce the intake air amount Qa under the first air-fuel ratio control mode, and by decreasing the opening of intake throttle valve 5 with EGR stopped in such a manner as to consume all the oxygen to be burned by combustion and thereby decrease the oxygen concentration in the exhaust gas under the second air-fuel ratio control mode.

Figure 12:
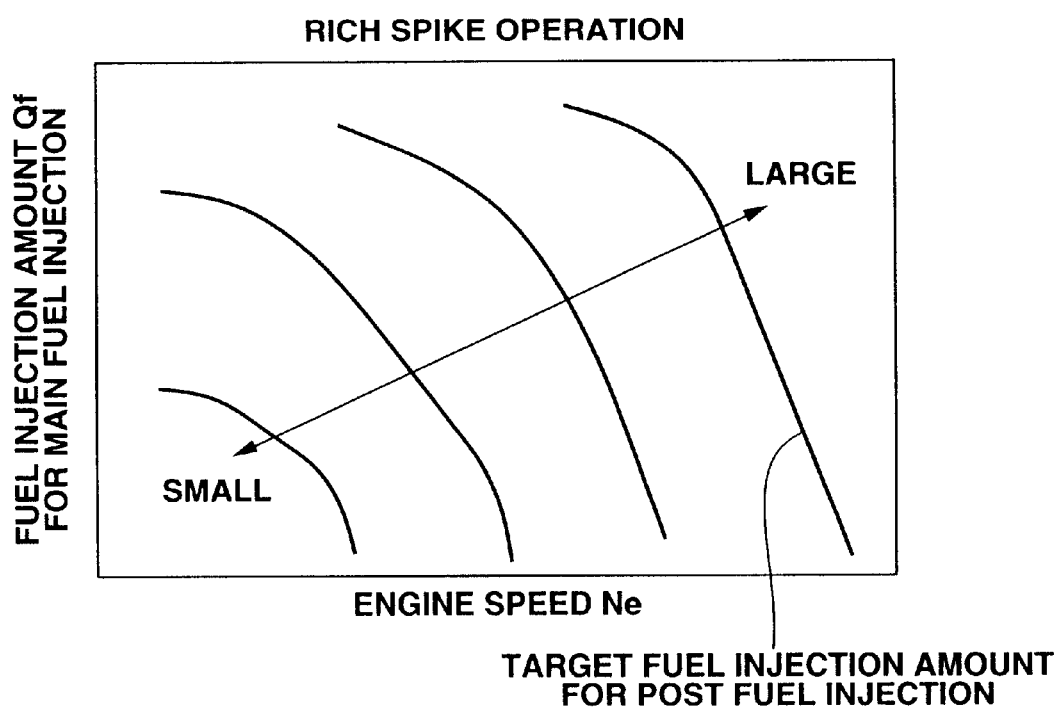
FIG. 12 is a graph showing a target post fuel injection amount for rich spike operation.

It is also possible to lower the excess air factor λ to the target excess air factor λ1 by only adjusting the opening of fuel injection valve 9 to increase the post fuel injection amount under the first air-fuel ratio control mode, and by adjusting the opening of intake throttle valve 5 to reduce the intake air amount Qa and, at the same time, adjusting the opening of fuel injection valve 9 to decrease the post fuel injection amount under the second air-fuel ratio control mode. Herein, the post fuel injection amount is adjusted to a target fuel injection amount determined by a relationship between the engine speed Ne and the fuel injection amount Qf for main fuel injection as in FIG. 12. It means that the excess air factor λ is controlled in terms of the amount of unburned fuel under the first air-fuel ratio control mode and controlled in terms of the amount of air under the second air-fuel ratio control mode.

It is further possible to lower the excess air factor λ by adjusting the EGR rate, the intake air amount Qa and the post fuel injection amount by means of EGR valve 12, intake throttle valve 5 and fuel injection valve 9, respectively, under the first air-fuel ratio control mode, and by adjusting only the intake air amount Qa by means of intake air valve 5 or adjusting the intake air amount Qa and the post fuel injection amount by means of intake throttle valve 5 and fuel injection valve 9, while stopping EGR, under the second air-fuel ratio control mode. In this case, the post fuel injection amount is decreased depending on the intake air amount Qa under the second air-fuel ratio control mode.

In step S2-5, controlunit20 judges whether rich spike operation time t (i.e. the time elapsed from the start of the rich spike operation) has exceeded a predetermined value t1. The value t1 is generally set to about 1 to 3 seconds. If t>t1, NOx trap catalyst 13 is considered to be regenerated on completion of the purification of the trapped NOx. Control unit 20 sets the trapped NOx amount QNOx to "0" (i.e. clears the integral of the amount of NOx trapped on catalyst 13 per unit time) in step S2-6, and then, clears the reg1 flag in step S2-7. If t≦t1, control goes to return.

When reg2=1 in step S1-5, control unit 20 proceeds with the rich spike operation as follows in a state that NOx trap catalyst 13 has a low activity.

In step S3-1, control unit 20 determines a space velocity SV in the same manner as in step S2-1.

In step S3-2, control unit 20 judges whether the space velocity SV determined in step S3-1 is larger than the predetermined value SV1. The value SV1 is the same in steps S2-2 and S3-2. If SV≦SV1, control goes to step S3-3.

In step S3-3, control unit 20 selects the second air-fuel ratio control mode and starts the rich spike operation in the second air-fuel ratio control mode as in step S2-4. More specifically, control unit 20 discontinues EGR by adjusting EGR valve 12 and, at the same time, sets the target excess air factor λ1 and controls the excess air factor λ of the exhaust gas to the target excess air factor λ1 by adjusting intake throttle valve 5 in such a manner as to attain the target intake air amount as determined in FIG. 11. For error correction, feedback control is performed based on the signal from air-fuel ratio sensor 25. Alternatively, the rich spike operation may be performed by adjusting any of EGR rate, air intake amount and post fuel injection amount as mentioned above.

In step S3-4, control unit 20 judges whether rich spike operation time t (i.e. the time elapsed from the start of the rich spike operation) has exceeded the predetermined value t1. If t>t1, NOx trap catalyst 13 is considered to be regenerated on completion of the purification of the trapped NOx. Control unit 20 sets the trapped NOx amount QNOx to "0" (i.e. clears the integral of the amount of NOx amount trapped on catalyst 13 per unit time) in step S3-5, and clears the reg2 flag in step S3-6. If t≦t1, control goes to return.

If SV>SV1 in step S3-2, the activity of NOx trap catalyst 13 is too low to attain sufficient NOx purification performance under the rich spike operation. Thus, control unit 20 clears the reg2 flag in step S3-6 so as to call off the air-fuel ratio control.

As described above, control unit 20 selectively switches between the first and second air-fuel ratio control modes according to whether the concentration of oxygen in the exhaust gas needs to be decreased. This makes it possible to maintain sufficient NOx purification performance while eliminating the possibility of not reducing NOx to a sufficient degree because of the reaction of the reducing agent (HC, CO) and oxygen in the exhaust gas, even when the concentration of oxygen in the exhaust gas is relatively high.

Further, the target excess air factor λ1 is set to the same value in steps S2-3 and S2-4 for the rich spike operation, so that the exhaust gas air-fuel ratio is controlled to the same target air-fuel ratio in both the first and second air-fuel ratio control modes. By controlling the exhaust gas air-fuel ratio to such a constant value, variances in the emissions of NOx, HC and CO can be avoided. This makes it possible not only to prevent a deterioration in automotive emissions due to excessive rich spike operation but also to prevent a deterioration in NOx purification performance due to insufficient rich spike operation.

The entire contents of Japanese Patent Application No. 2002-000805 (filed on Jan. 7, 2002) are herein incorporated by reference.

Although the present invention has been described with reference to a specific embodiment of the invention, the invention is not limited to the above-described embodiment. Various modification and variation of the embodiment described above will occur to those skilled in the art in light of the above teaching. The scope of the invention is defined with reference to the following claims.

What is claimed is:

1. An exhaust gas purification apparatus for an internal combustion engine, comprising:

a NOx trap catalyst disposed in an exhaust passage of the internal combustion engine, the NOx trap catalyst being capable of trapping thereon NOx in exhaust gas when an air-fuel ratio of the exhaust gas is lean and reductively purifying the trapped NOx when the air-fuel ratio of the exhaust gas is rich; and a control unit configured to:
decide on a purification timing at which NOx trapped on the NOx trap catalyst is purified;
determine a space velocity of the exhaust gas;
at the purification timing, select either one of a first air-fuel ratio control mode for controlling the air-fuel ratio of the exhaust gas to a rich air-fuel ratio with no need to decrease a concentration of oxygen in the exhaust gas and a second air-fuel ratio control mode for not only controlling the air-fuel ratio of the exhaust gas to a rich air-fuel ratio but also making the concentration of oxygen in the exhaust gas lower than that of the first air-fuel ratio control mode, according to the determined space velocity; and
control the air-fuel ratio of the exhaust gas in the selected air-fuel ratio control mode, thereby purifying NOx trapped on the NOx trap catalyst.

2. An exhaust gas purification apparatus according to claim 1, wherein the control unit is configured to determine the space velocity of the exhaust gas based on at least one of an intake air amount, an engine speed and a fuel injection amount for main fuel injection of the engine.

3. An exhaust gas purification apparatus according to claim 1, wherein the control unit is configured to select the first air-fuel ratio control mode when the determined space velocity is lower than or equal to a threshold value and to select the second air-fuel ratio control mode when the determined space velocity is higher than the threshold value.

4. An exhaust gas purification apparatus according to claim 1, wherein the control unit is configured to set a target air-fuel ratio and control the air-fuel ratio of the exhaust gas to the set target air-fuel ratio in the first and second air-fuel ratio control modes.

5. An exhaust gas purification apparatus according to claim 1, wherein the control unit is configured to control the air-fuel ratio of the exhaust gas by adjusting at least one of an exhaust gas recirculation valve, an intake valve and a fuel injection valve of the engine in the first and second air-fuel ratio control modes.

6. An exhaust gas purification apparatus according to claim 5, wherein the control unit is configured to discontinue exhaust gas recirculation by adjusting the exhaust gas recirculation valve under the second air-fuel ratio control mode.

7. An exhaust gas purification apparatus according to claim 6, wherein the control unit is configured to adjust the exhaust gas recirculation valve in such a manner as to attain a high exhaust gas recirculation rate under the first air-fuel ratio control mode and to adjust the intake valve in such a manner as to decrease an intake air amount under the second air-fuel ratio control mode.

8. An exhaust gas purification apparatus according to claim 5, wherein the control unit is configured to adjust the fuel injection valve in such a manner as to increase a fuel injection amount for post fuel injection under the first air-fuel ratio control mode and to adjust the intake valve in such a manner as to decrease an intake air amount under the second air-fuel ratio control mode.

9. An exhaust gas purification apparatus for an internal combustion engine, comprising:
a NOx trap catalyst disposed in an exhaust passage of the internal combustion engine, the NOx trap catalyst being capable of trapping thereon NOx in exhaust gas when an air-fuel ratio of the exhaust gas is lean and reductively purifying the trapped NOx when the air-fuel ratio of the exhaust gas is rich; and
a control unit having:
means for deciding on a purification timing at which NOx trapped on the NOx trap catalyst is purified;
means for determining a space velocity of the exhaust gas;
means for, at the purification timing, selecting either one of a first air-fuel ratio control mode for controlling the air-fuel ratio of the exhaust gas to a rich air-fuel ratio with no need to decrease a concentration of oxygen in the exhaust gas and a second air-fuel ratio control mode for not only controlling the air-fuel ratio of the exhaust gas to a rich air-fuel ratio but also making the concentration of oxygen in the exhaust gas lower than that of the first air-fuel ratio control mode, according to the determined space velocity; and
means for controlling the air-fuel ratio of the exhaust gas in the selected air-fuel ratio control mode, thereby purifying NOx trapped on the NOx trap catalyst.

10. An exhaust gas purification process for an internal combustion engine with the use of a NOx trap catalyst, the NOx trap catalyst being disposed in an exhaust passage of the engine and capable of trapping thereon NOx in exhaust gas when an air-fuel ratio of the exhaust gas is lean and reductively purifying the trapped NOx when the air-fuel ratio of the exhaust gas is rich, the process comprising:
deciding on a purification timing at which NOx trapped on the NOx trap catalyst is purified;
determining a space velocity of the exhaust gas;
at the purification timing, selecting either one of a first air-fuel ratio control mode for controlling the air-fuel ratio of the exhaust gas to a rich air-fuel ratio with no need to decrease a concentration of oxygen in the exhaust gas and a second air-fuel ratio control mode for not only controlling the air-fuel ratio of the exhaust gas to a rich air-fuel ratio but also making the concentration of oxygen in the exhaust gas lower than that of the first air-fuel ratio control mode, according to the determined space velocity; and
controlling the air-fuel ratio of the exhaust gas in the selected air-fuel ratio control mode, thereby purifying NOx trapped on the NOx trap catalyst.

11. An exhaust gas purification process according to claim 10, wherein the space velocity of the exhaust gas is determined based on at least one of an intake air amount, an engine speed and a fuel injection amount for main fuel injection of the engine.

12. An exhaust gas purification process according to claim 10, wherein the first air-fuel ratio control mode is selected when the determined space velocity is lower than or equal to a threshold value, and the second air-fuel ratio control mode is selected when the determined space velocity is higher than the threshold value.

13. An exhaust gas purification process according to claim 10, further comprising setting a same target air-fuel ratio, wherein the air-fuel ratio of the exhaust gas is controlled to the set target air-fuel ratio in the first and second air-fuel ratio control modes.

14. An exhaust gas purification process according to claim 10, wherein said controlling comprises adjusting at least one of an exhaust gas recirculation valve, an intake valve and a fuel injection valve of the engine.

15. An exhaust gas purification process according to claim 14, wherein said controlling comprises discontinuing exhaust gas recirculation by adjusting the exhaust gas recirculation valve under the second air-fuel ratio control mode.

16. An exhaust gas purification process according to claim 15, wherein said controlling comprises adjusting the exhaust gas recirculation valve in such a manner as to attain a high exhaust gas recirculation rate under the first air-fuel ratio control mode and adjusting the intake valve in such a manner as to decrease an intake air amount under the second air-fuel ratio control mode.

17. An exhaust gas purification process according to claim 14, wherein said controlling comprises adjusting the fuel injection valve in such a manner as to increase a fuel injection amount for post fuel injection under the first air-fuel ratio control mode and adjusting the intake valve in such a manner as to decrease an intake air amount under the second air-fuel ratio control mode.

18. An exhaust gas purification apparatus for an internal combustion engine, comprising:
    a NOx trap catalyst disposed in an exhaust passage of the internal combustion engine, the NOx trap catalyst being capable of trapping thereon NOx in exhaust gas when an air-fuel ratio of the exhaust gas is lean and reductively purifying the trapped NOx when the air-fuel ratio of the exhaust gas is rich; and
    a control unit configured to:
        decide on a purification timing for reductively purifying NOx trapped on the NOx trap catalyst; and
        at the purification timing, selectively switch between a first air-fuel ratio control mode for controlling the air-fuel ratio of the exhaust gas to a rich air-fuel ratio and a second air-fuel ratio control mode for not only controlling the air-fuel ratio of the exhaust gas to a rich air-fuel ratio but also making the concentration of oxygen in the exhaust gas lower than that of the first air-fuel ratio control mode,
        wherein the first air-fuel ratio control mode is selected upon judging a concentration of oxygen in the exhaust gas flowing into the NOx trap catalyst per unit time as being high, and the second air-fuel ratio control mode is selected upon judging the concentration of oxygen in the exhaust gas flowing into the NOx trap catalyst as being low.

19. An exhaust gas purification apparatus according to claim 18, wherein the control unit is configured to judge the concentration of oxygen flowing into the NOx trap catalyst as being high when a space velocity of the exhaust gas is higher than a threshold value and judge the concentration of oxygen flowing into the NOx trap catalyst as being low when the space velocity of the exhaust gas is lower than or equal to the threshold value.

20. An exhaust gas purification apparatus according to claim 18, wherein the control unit is configured to calculate a space velocity of the exhaust gas from at least one of an intake air amount, an engine speed and a fuel injection amount for main fuel injection of the engine.

21. An exhaust gas purification apparatus according to claim 18, wherein the control unit is configured to set a target air-fuel ratio and control the air-fuel ratio of the exhaust gas to the target air-fuel ratio in the first and second air-fuel ratio control modes.

22. An exhaust gas purification apparatus according to claim 18, further comprising:
    an exhaust gas recirculation valve disposed in an exhaust gas recirculation passage of the engine; and
    an intake valve disposed in an intake passage of the engine,
    wherein the control unit is configured to control the air-fuel ratio of the exhaust gas by adjusting at least the exhaust gas recirculation valve in the first air-fuel ratio control mode and by adjusting the intake valve in the second air-fuel ratio control mode.

23. An exhaust gas purification apparatus according to claim 18, further comprising:
    an intake valve disposed in an intake passage of the engine; and
    a fuel injector that performs post fuel injection,
    wherein the control unit is configured to control the air-fuel ratio by adjusting the post fuel injection in the first air-fuel ratio control mode and by adjusting the intake valve in the second air-fuel ratio control mode.

* * * * *